US005409134A

United States Patent [19]

Cowger et al.

[11] Patent Number: 5,409,134

[45] Date of Patent: Apr. 25, 1995

[54] PRESSURE-SENSITIVE ACCUMULATOR FOR INK-JET PENS

[75] Inventors: Bruce Cowger; Marc A. Baldwin; Fred E. Tarver; Gary D. Tarver; John G. Wydronek; George M. Custer, all of Corvallis, Oreg.

[73] Assignee: Hewlett-Packard Corporation, Palo Alto, Calif.

[21] Appl. No.: 805,438

[22] Filed: Dec. 11, 1991

Related U.S. Application Data

[63] Continuation-in-part of Ser. No. 464,258, Jan. 12, 1990, abandoned.

[51] Int. Cl.$^6$ .............................................. G01D 18/00

[52] U.S. Cl. .................................... 222/1; 222/386.5; 347/87

[58] Field of Search .................... 346/140 R, 140 PD; 222/386.5, 206, 207, 209, 263, 335, 336, 401, 95; 347/86, 87

[56] References Cited

U.S. PATENT DOCUMENTS 3,008,476 11/1961 Pepin ............................ 222/386.5 X
3,235,138 2/1966 Bull .............................. 222/386.5 X
3,294,289 12/1966 Bayne et al. ................. 222/386.5 X
3,343,422 9/1967 McSmith ...................... 222/386.5 X
3,414,165 12/1968 Goodenow ........................... 222/82
3,415,277 12/1968 Mitchell et al. ............. 222/386.5 X
3,418,059 12/1968 Robe ............................... 222/103 X
3,656,660 4/1972 Mueller ............................ 222/212 X
3,767,078 10/1973 Gortz et al. ................. 222/386.5 X
3,931,834 1/1976 Caillet .......................... 222/386.5 X
4,121,737 10/1978 Kain ................................ 222/212 X
4,217,058 8/1980 Straiszewski et al. ....... 222/386.5 X
4,279,363 7/1981 Alikhan ........................... 222/212 X
4,392,578 7/1983 Fipp et al. ....................... 222/401 X
4,412,232 10/1983 Weber et al. ...................... 347/87 X
4,419,678 12/1983 Kasugayama .
4,420,100 12/1983 Mueller ............................ 222/212 X
4,422,084 12/1983 Saito .
4,503,443 3/1985 Dagna et al. ...................... 347/87 X
4,509,062 4/1985 Low et al. ............................. 347/87
4,689,642 8/1987 Sugitani .
4,723,688 2/1988 Munoz .......................... 222/386.5 X
4,728,004 3/1988 Bonerb .......................... 222/386.5 X
4,763,818 8/1988 Stefano et al. .................. 222/401 X
4,992,802 2/1991 Dion et al. ............... 346/140 PD X
5,039,999 8/1991 Winslow et al. .
5,040,001 8/1991 Dunn et al. .
5,040,002 8/1991 Pollacek et al. .
5,153,612 10/1992 Dunn et al. .................. 346/140 PD
5,270,739 12/1993 Kitani et al. .......................... 347/87

FOREIGN PATENT DOCUMENTS 0375388 6/1990 European Pat. Off. .
2742633 4/1979 Germany .
56-92072 7/1981 Japan .
59-232872 12/1984 Japan .
2063175 6/1981 United Kingdom .
2183737 6/1987 United Kingdom ................ 222/401

*Primary Examiner*—Kevin P. Shaver
*Assistant Examiner*—Kenneth DeRosa

[57] ABSTRACT

The accumulator regulates changes in the back pressure of an ink-jet pen reservoir so that ink does not leak from the pen print head and so that the print head is able to completely empty the reservoir of ink. The accumulator includes a flexible bag that is mounted to a flat curved spring. The elasticity of the spring tends to contract the bag as the bag expands in response to back pressure reduction in the reservoir.

40 Claims, 10 Drawing Sheets

FIG. 7
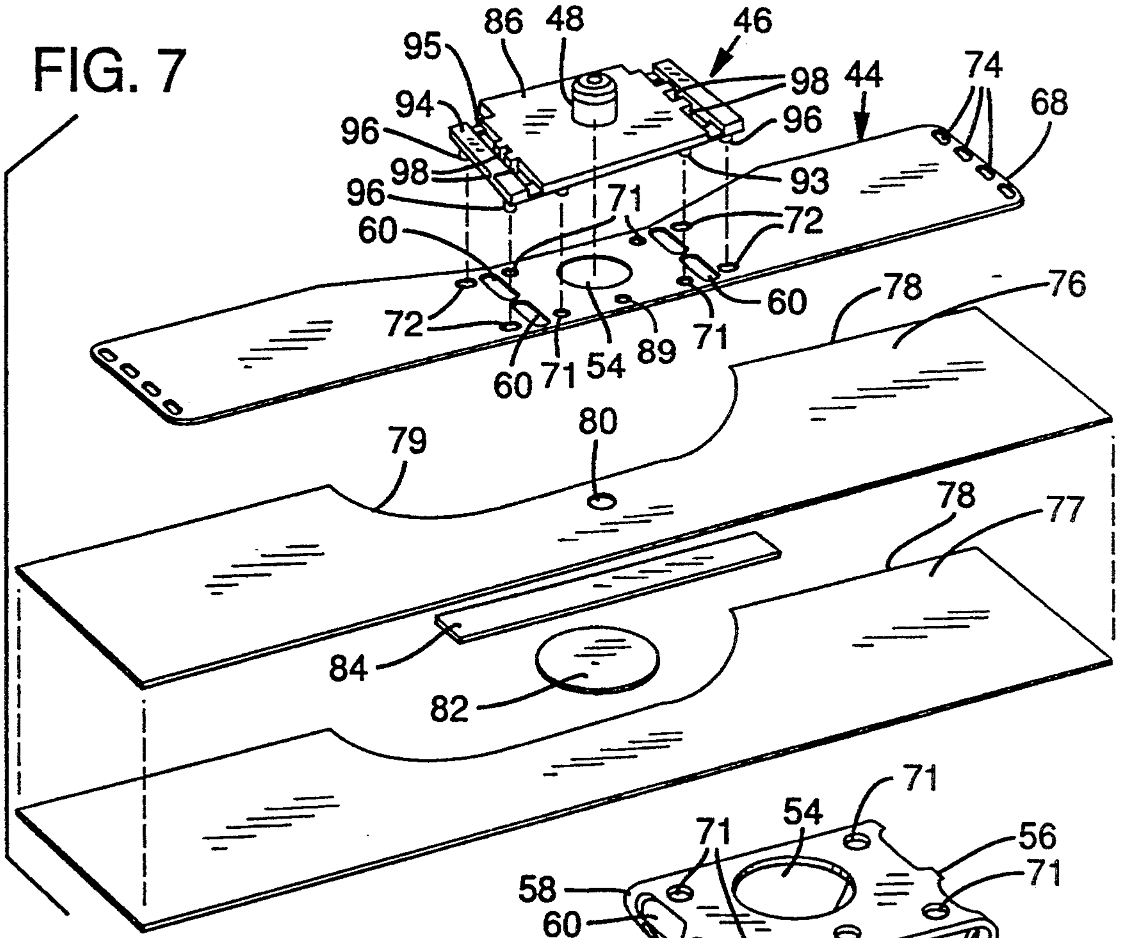
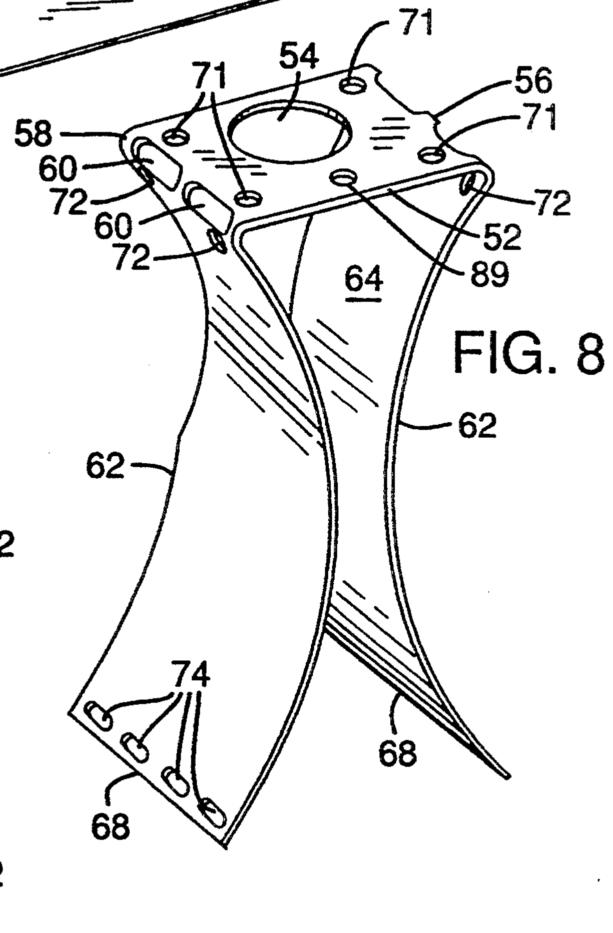
FIG. 8
FIG. 9
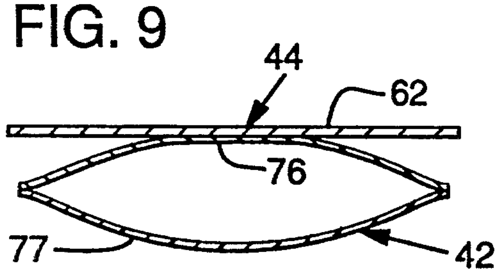
FIG. 11
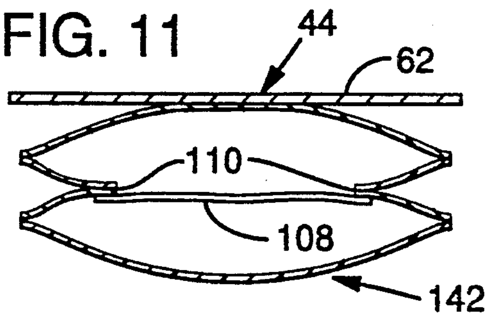

PRESSURE-SENSITIVE ACCUMULATOR FOR INK-JET PENS

This is a continuation-in-part of application Ser. No. 07/464,258, filed Jan. 12, 1990, now abandoned.

TECHNICAL FIELD

This invention pertains to mechanisms for regulating the fluid pressure within the ink reservoir of an ink-jet pen.

BACKGROUND INFORMATION

Ink-jet printing generally involves the controlled delivery of ink drops from an ink-jet pen reservoir to a printing surface. One type of ink-jet printing, known as drop-on-demand printing, employs a pen that has a print head that is responsive to control signals for ejecting drops of ink from the ink reservoir.

Drop-on-demand type print heads typically use one of two mechanisms for ejecting drops: thermal bubble or piezoelectric pressure wave. A thermal bubble type print head includes a thin-film resistor that is heated to cause sudden vaporization of a small portion of the ink. The rapid expansion of the ink vapor forces a small amount of ink through a print head orifice.

Piezoelectric pressure wave type print heads use a piezoelectric element that is responsive to a control signal for abruptly compressing a volume of ink in the print head to thereby produce a pressure wave that forces the ink drops through the orifice.

Although conventional drop-on-demand print heads are effective for ejecting or "pumping" ink drops from a pen reservoir, they do not include any mechanism for preventing ink from permeating through the print head when the print head is inactive. Accordingly, drop-on-demand techniques require that the fluid in the ink reservoir must be stored in a manner that provides a slight back pressure at the print head to prevent ink leakage from the pen whenever the print head is inactive. As used herein, the term "back pressure" means the partial vacuum within the pen reservoir that resists the flow of ink through the print head. Back pressure is considered in the positive sense so that an increase in back pressure represents an increase in the partial vacuum. Accordingly, back pressure is measured in positive terms, such as water column height.

The back pressure at the print head must be at all times strong enough for preventing ink leakage. The back pressure, however, must not be so strong that the print head is unable to overcome the back pressure to eject ink drops. Moreover, the ink-jet pen must be designed to operate despite environmental changes that cause fluctuations in the back pressure.

A severe environmental change that affects reservoir back pressure occurs during air transport of an ink-jet pen. In this instance, ambient air pressure decreases as the aircraft gains altitude and is depressurized. As ambient air pressure decreases, a correspondingly greater amount of back pressure is needed to keep ink from leaking through the print head. Accordingly, the level of back pressure within the pen must be regulated during times of ambient pressure drop.

The back pressure within an ink-jet pen reservoir is subjected to what may be termed "operational effects". One significant operational effect occurs as the print head is activated to eject ink drops. The consequent depletion of ink from the reservoir increases (makes more negative) the reservoir back pressure. Without regulation of this back pressure increase, the ink-jet pen will eventually fail because the print head will be unable to overcome the increased back pressure to eject ink drops.

Past efforts to regulate ink-jet reservoir back pressure in response to environmental changes and operational effects have included mechanisms that may be collectively referred to as accumulators.

Generally, prior accumulators comprise an elastomeric bladder or cup-like mechanism that defines a volume that is in fluid communication with the ink-jet pen reservoir volume. The accumulators are designed to move between a minimum volume position and a maximum volume position in response to changes in the level of the back pressure within the reservoir. Accumulator movement changes the overall volume of the reservoir to regulate back pressure level changes so that the back pressure remains within an operating range that is suitable for preventing ink leakage while permitting the print head to continue ejecting ink drops.

For example, as the difference between ambient pressure and the back pressure within the pen decreases as a result of ambient air pressure drop, the accumulator moves to increase the reservoir volume to thereby increase the back pressure to a level, within the range discussed above, that prevents ink leakage. Put another way, the increased volume attributable to accumulator movement prevents a decrease in the difference between ambient air pressure and back pressure that would otherwise occur if the reservoir were constrained to a fixed volume as ambient air pressure decreased.

Accumulators also move to decrease the reservoir volume whenever environmental changes or operational effects (for example, ink depletion occurring during operation of the pen) cause an increase in the back pressure. The decreased volume attributable to accumulator movement reduces the back pressure to a level within the operating range, thereby permitting the print head to continue ejecting ink.

Accumulators are usually equipped with internal or external resilient mechanisms that continuously urge the accumulators toward a position for increasing the volume of the reservoir. The effect of the resilient mechanisms is to retain a sufficient minimum back pressure within the reservoir (to prevent ink leakage) even as the accumulator moves to increase or decrease the reservoir volume.

Prior accumulator designs suffer from at least two deficiencies. First, the working volume of the accumulator (that is, the maximum reservoir volume increase or decrease that is provided by the accumulator) was limited in size. Specifically, the working volume of the accumulator was limited to the maximum size of the bladder or similar structure that could be housed within the ink-jet pen. Accordingly, the environmental operating range of prior pens, which range may be quantified as the maximum ambient pressure drop the pen could sustain without leakage, was limited by the size of the working volume of the accumulator.

One prior approach to overcoming the working volume size limitation just described lead to the inclusion of a catch basin within the ink-jet pen. The catch basin provides a volume for receiving through an overflow orifice ink that is forced out of the reservoir as ambient pressure continues to drop after the accumulator moves into its maximum reservoir volume position. The continued drop in ambient pressure eventually eliminates the difference between ambient pressure and the back pressure within the reservoir. Eventually, a low-level positive pressure develops within the reservoir. The low-level positive pressure forces the ink through the overflow orifice into the catch basin. The inclusion of the overflow orifice and catch basin is intended to prevent the positive pressure in the reservoir from rising to a level that would permit ink to leak out of the inactive print head.

Use of catch basins is undesirable because they employ space within the ink-jet pen assembly that could otherwise be used as ink reservoir space. Moreover, it is difficult to design the pen so that ink is forced through the overflow orifice but not through the print head.

A second deficiency in prior accumulator designs pertains to a feature known as drawdown. Drawdown is the amount of ink volume that must be withdrawn from a filled ink-jet pen in order to establish within the reservoir a minimum back pressure to ensure ink does not leak through the print head. This minimum back pressure is typically established at the time the pen is filled with ink, that is, at the time the air volume in the reservoir is minimal. It is desirable to remove as little "drawdown" ink as possible in order to establish the minimum back pressure since the withdrawal of ink for this purpose reduces the amount of ink that can be used for printing.

Prior accumulators, being formed of moldable elastomers, generally allow significant volumes of air to diffuse through their walls. Correspondingly, larger drawdown volumes were required in prior accumulators so that the addition of air into the reservoir by diffusion did not cause the accumulators to expand to their maximum volume. It can be appreciated that the reservoir back pressure is lost when the accumulators attain their maximum volume.

SUMMARY OF THE INVENTION

The present invention is directed to a pressure-sensitive accumulator for ink-jet pens and provides an accumulator working volume that is sufficient for operating the pen notwithstanding extreme environmental changes and operational effects on the back pressure within a reservoir.

The accumulator of the present invention is constructed to provide a working volume of a size large enough to eliminate the need for a catch basin or similar overflow mechanism. Accordingly, the amount of ink available for printing is maximized with the accumulator of the present invention.

The accumulator of the present invention is configured so that the relationship between the reservoir back pressure and the movement of the accumulator is such that very little drawdown ink must be removed to establish the minimum back pressure within in the reservoir. Consequently, the amount of ink available for printing is only marginally reduced because of drawdown.

The invention can be generally described as including a spring having an expandable bag attached thereto. The spring and bag are positioned within the reservoir of an ink-jet pen so that the interior of the bag is in fluid communication with air outside of the reservoir. The bag and spring are configured so that the bag expands and contracts in response both to fluid pressure changes within the reservoir and to ambient pressure changes outside of the reservoir. The spring is deflected by the expansion of the bag. The deflected spring urges the bag toward a contracted or minimum volume position.

The bag and spring are configured so that the bag expansion and contraction affects the reservoir volume in a manner that maintains the reservoir back pressure with in an acceptable operating range despite extreme variations in the ambient air pressure.

As another aspect of this invention, the spring is configured to bend to conform to the bag shape when the spring is deflected by the expanding bag, thereby permitting the bag to expand to its maximum available volume. This configuration of the spring also makes more uniform the bag's expansion and contraction response to changes in ambient pressure and reservoir back pressure.

Other features and advantages of the present invention will be apparent from the following detailed description, which proceeds with reference to the accompanying drawings.

BRIEF DESCRIPTION OF THE DRAWINGS

FIG. 7 is an exploded perspective view of the accumulator components.

FIG. 8 is a perspective view of the spring component of the accumulator after it is shaped into its undeflected position.

FIG. 9 is a cross sectional view taken along line 9—9 of FIG. 2.

FIG. 11 is a cross section of a portion of an alternative embodiment of the accumulator of the present invention.

DETAILED DESCRIPTION

Figure 1:
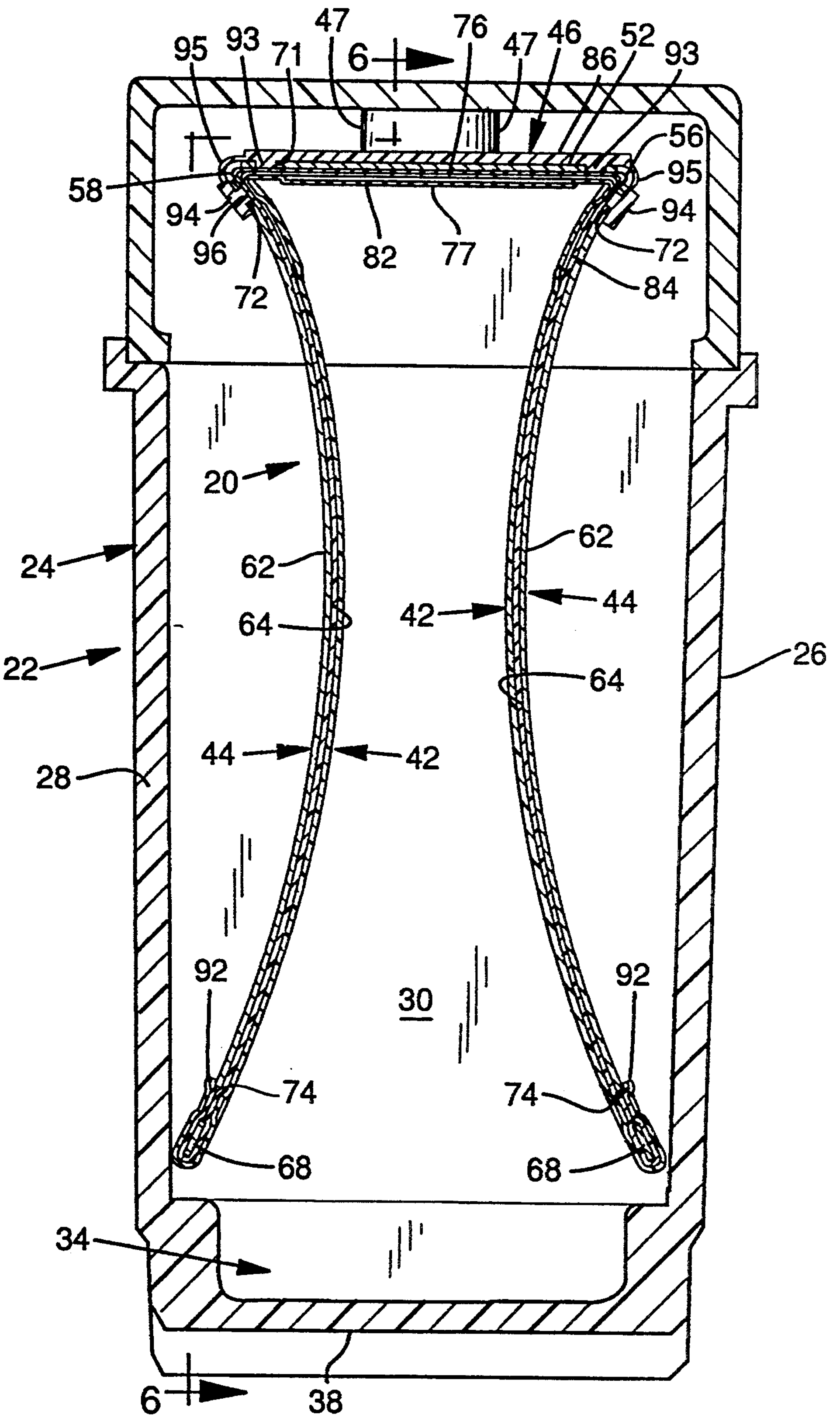
FIG. 1 is a front cross section of an ink-jet pen that includes the accumulator of the present invention shown in the contracted or minimum volume position.

The accumulator of the present invention is configured to have a working volume (that is, the maximum reservoir volume increase or decrease that is provided by the accumulator) that can regulate back pressure within an ink-jet pen reservoir despite extreme changes in ambient air pressure. In this regard, the most severe pressure change affecting ink-jet pens normally occurs when the pens are transported by air. During such transport, the pens are disposed within an aircraft cabin, which, at its greatest altitude, is pressurized to a level that is substantially below atmospheric pressure at sea level. Consequently, the working volume of the present accumulator is established to compensate for the ambient (i.e., cabin) pressure drop affecting the pens.

For example, the air pressure within an airborne aircraft may be about 26% lower than the air pressure at sea level. Consequently, the air pressure within the aircraft will drop about 26% after the aircraft leaves the ground. The accumulator of the present invention is movable to increase the pen reservoir volume by an amount (that is, the working volume of the accumulator) necessary to prevent the 26% drop in the ambient pressure from effecting a corresponding drop in the reservoir back pressure. As discussed earlier, the reservoir volume increase attributable to the accumulator maintains the back pressure at a level that prohibits ink from leaking through the print head of the pen.

The size of the reservoir volume increase necessary to compensate for any ambient pressure drop is related to the amount of air that is in the reservoir at the time the ambient pressure decreases. Consequently, the largest amount of reservoir volume change that must be provided by an accumulator will occur in instances where the greatest amount of air is in the pen, that is, when the pen is nearly empty of ink. In short, the working volume $V_{ac}$ of the accumulator must be greater than or equal to the volume increase of air within the reservoir as a nearly empty pen is subjected to the extreme pressure decrease just described. In equation form:

$$V_{ac} \geqq V_r*(P_o/P) - V_r \quad [1]$$

Where $V_r$ is the reservoir volume determined with the accumulator displacing its maximum volume from the reservoir volume, and where $P_o$ is the initial ambient (cabin) air pressure at sea level, and P is the minimum pressure level to which the aircraft cabin is pressurized after the aircraft becomes airborne.

The amount of ink remaining in the nearly empty pen reservoir is not subtracted from the volume $V_r$ in equation 1 above. Consequently, the accumulator working volume $V_{ac}$ calculated in equation 1 is slightly larger than that actually required. Nevertheless, it is preferable to have the accumulator working volume sized slightly larger than that calculated in order to compensate for variations in the accumulator production process and for any air diffusion through the accumulator as discussed more fully below.

The relationship among the reservoir volume $V_r$, pressures $P_o$, and P, and the accumulator working volume $V_{ac}$, may be expressed in terms of deliverable ink $V_d$. Deliverable ink $V_d$ is the amount of ink stored in a pen that is ready for printing. The greatest quantity of deliverable ink is available when the pen is filled with ink and the accumulator is in its minimum volume position, or:

$$V_d = V_r + V_{ac} \quad [2]$$

or:

$$V_r = V_d - V_{ac} \quad [3]$$

Substituting equation 3 into equation 1 and solving for $V_{ac}$ yields:

$$V_{ac} \geqq V_d*(1 - P/P_o) \quad [4]$$

It can be appreciated that the quantity in parentheses in equation 4 is the fractional value of the relative air pressure increase occurring within the reservoir as a result of the ambient pressure drop $P_o - P$ experienced by the pen. Accordingly, under the extreme condition noted above, whereby the ambient pressure drop is about 26%, equation 4 shows that the working volume of the accumulator must be 26% of the volume of the deliverable ink in the pen. For example, a pen having a 40 cc volume of deliverable ink would require an accumulator having a working volume of 10.4 cc in order to withstand a 26% ambient air pressure drop without leaking.

It is noteworthy that although the ambient pressure decrease $P_o - P$ was discussed above with respect to air transport of pens, it can be appreciated that the air within the reservoir can expand and contract due to temperature changes as well as ambient pressure changes. For example, a pen subjected to high temperatures will incur an expansion of the air in its reservoir, and one skilled in the art can derive the quantitative analogy between pressure and temperature excursions. It is believed, however, that the ambient pressure decrease associated with air transport of pens provides the most severe ambient pressure change experienced by the pens. Accordingly, the accumulator of the present invention is designed to compensate for such a change.

With reference to FIGS. 1–9, an accumulator 20 formed in accordance with the present invention provides an accumulator working volume $V_{ac}$ that effectively compensates for severe environmental changes or operational effects on the back pressure within an ink-jet pen reservoir. More particularly, the accumulator 20 is configured to fit into an ink-jet pen 22 that includes a reservoir 24 having rigid side walls 26, 28, 30, 32 that are configured to hold a quantity of ink. A well 34 is formed in the bottom of the reservoir 24 near one side wall 30. A thermal-bubble type print head 36 is fit into the bottom wall 38 of the reservoir 24 for ejecting ink drops from the reservoir 24. The configuration of the reservoir walls and print head may be substantially as provided in the pen component of an ink-jet printer manufactured by Hewlett-Packard Company of Palo Alto, Calif., under the trademark DeskJet.

The accumulator 20 is attached to a cap 40 that is sealed to the top of the side walls 26, 28, 30, 32 of the reservoir 24. The accumulator 20 includes an expandable bag 42 that is mounted to a spring 44. The bag 42 and spring 44 are fastened to a fitment 46 that has an upwardly projecting boss 48. The boss 48 is sealed to a cylindrically shaped sleeve 47 that is integrally formed with the top of the cap 40.

The bag 42 is fastened to the fitment 46 so that the interior of the bag is in fluid communication with the lower end 90 of a central duct 50 that passes through the boss 48. The fitment 46 is mounted to the cap 40 of the pen 22 with the duct 50 arranged so that the upper end 51 of the duct is in fluid communication with ambient air. Accordingly, the interior of the bag 42 is in fluid communication with ambient air.

With the accumulator 20 in place, the reservoir 24 is filled with ink through a sealable port 43. A slight back pressure (hereinafter referred to as the minimum back pressure) is established within the pen reservoir 24. The minimum back pressure is the minimum amount of back pressure necessary to keep ink from leaking through the print head 36 when the print head is inactive.

As the pen 22 is used for printing, the air pressure within the reservoir 24 decreases (hence, the back pressure increases) as ink is depleted. During printing, the bag 42 expands as a result of the back pressure increase. The bag expansion decreases the volume of the reservoir 24 to maintain the reservoir back pressure within a range such that the print head 36 is able to continue ejecting ink from the reservoir 24. If the ambient pressure should thereafter decrease (for example, during air transport of the pen), the bag 42 will contract to increase the reservoir volume so that the back pressure within the reservoir 24, relative to ambient, does not drop to a level that permits ink to leak from the print head 36.

Expansion of the bag 42 deflects the spring 44. The elasticity of the spring 44 tends to contract the bag 42. The spring 44 and bag 42 are configured and arranged to define a back pressure and bag volume relationship that maintains the reservoir back pressure within an operating range that is suitable for preventing ink leakage, while permitting the print head 36 to continue ejecting ink drops. Moreover, the accumulator 20 is configured so that the maximum volume of the bag 42, that is, the working volume $V_{ac}$ of the accumulator, is large enough to maintain the reservoir back pressure within the operating range mentioned above, despite severe fluctuations in the pressure of the ambient air.

Turning now to the particulars of the accumulator 20 formed in accordance with the present invention, the preferred embodiment of the accumulator spring 44 comprises a strip of metal, such as stainless steel, having a thickness of approximately 75 microns ($\mu$) and a yield strength greater than 5,600 Kg/cm$^2$. The spring 44 may be stamped or etched from a flat sheet (FIG. 7) and shaped into the relaxed or undeflected configuration shown in FIG. 8.

The relaxed configuration of the spring 44 includes a flat base 52 having a round main aperture 54 formed therethrough. The spring 44 is bent at each edge 56, 58 of the base 52. A pair of elongated slots 60 are formed in the spring 44 at each base edge 56, 58 to facilitate bending of the spring 44 at the base edges 56, 58.

The spring 44 is formed to have curved legs 62. One leg 62 extends downwardly from each edge 56, 58 of the base 52. In a preferred embodiment, the legs 62 are approximately 5.7 cm long. The length of the legs 62 of the spring 44 are such that each end 68 of a leg 62 is very near the bottom wall 38 of the reservoir 24.

Each spring leg 62 is formed to have a radius of curvature of approximately 2.5 cm. Each leg 62 has a convex surface 64 facing inwardly toward the convex surface 64 of the other leg 62.

The spring 44 is sized to be substantially as wide as the space between side walls 30 and 32 (FIG. 6) of the pen reservoir 24. In a preferred embodiment, the legs 62 are approximately 2.5 cm wide.

Figure 6:
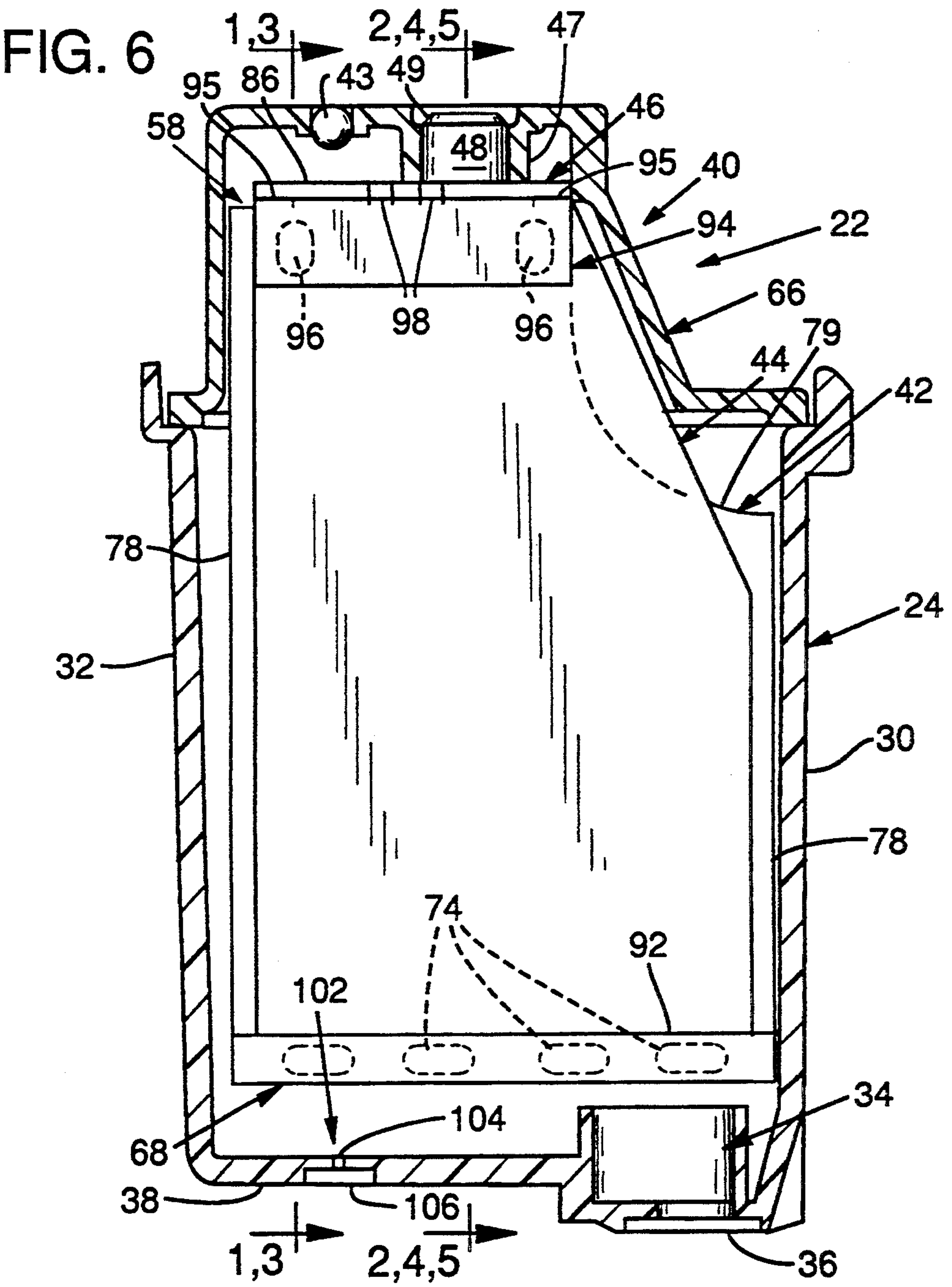
FIG. 6 is a side cross section of an ink-jet pen that includes the accumulator of the present invention.

As best seen in FIGS. 6 and 8, the spring 44 is relatively narrower in the region of the base 52. This shape of the spring 44 allows the accumulator 20 to fit within an ink-jet pen 22 that includes a cap 40 with a sloping front side 66 (FIG. 6). More particularly, the legs 62 of the spring 44 are tapered in width from each base edge 56, 58 to a location between the base edge and the end 68 of each leg 62. The spring width increases in the direction of the leg end 68. It is contemplated that a spring 44 having legs 62 of constant width would also be suitable. It is preferred, however, that the width of the spring 44 be shaped to fit across substantially the entire width of the reservoir 24 so that the bag 42 that is attached to the spring 44 will have the greatest width possible given the constraints of the reservoir side walls and cap configuration.

Four access holes 71 are formed in the spring base 52. One hole 71 is located near each corner of the base 52. Moreover, a pair of spaced apart access holes 72 are formed through the spring legs 62 beneath and near each base edge 56, 58. Four other spaced apart access holes 74 are formed through the ends 68 of each spring leg 62. The access holes 71, 72, 74 provide means for attaching the bag 42 to the spring 44, as described more fully below.

The bag 42 of the present invention is preferably formed of two thin flexible sheets 76, 77 (FIG. 7) that are sealed together at their outer edges 78. One sheet, the first sheet 76, has an opening 80 for permitting the passage of air into and out of the space between the edge-sealed first sheet 76 and second sheet 77. The sheets 76, 77 are shaped slightly larger (i.e., in width and length) than the spring 44. Moreover, the portion 79 of the edge 78 of each sheet that is near the tapered part of the spring 44 is shaped into a smooth curve.

Preferably, the first and second sheets 76, 77 are formed of a material that can be heat-welded (as at the edges 78) and that is substantially impermeable to air. Heat-weldable bag material is preferred because such material permits an efficient method for forming the bag 42 and for attaching the bag 42 to the spring 44 and fitment 46, as will be described more fully below.

Material that is substantially impermeable to air if preferred as bag material so that the back pressure within the pen reservoir 24 is not reduced by air that passes into the bag 42 through opening 80 and then diffuses through the walls of the bag sheets 76, 77 into the reservoir 24.

In view of the above, a preferred embodiment of the sheets 76, 77 that make up the bag 42 comprises a thin "barrier" film of material such as ethylene vinyl alcohol (EVOH) covered with thin outer layers of polyethylene. The EVOH film is preferably about 12 $\mu$ thick. The polyethylene layers are between 15 $\mu$ and 50 $\mu$ thick.

The EVOH film provides the desired low-air-permeability property. It is contemplated, however, that the barrier film for preventing diffusion of air through the bag 42 may be formed of a variety of materials such as PVDC (SARAN), nylon, polyester or metal foils, or combinations of such materials.

The polyethylene outer layers of the sheets 76, 77 provide the desired heat-weldable property. The use of polyethylene as outer bag layers is also advantageous because that material generally includes no cure accelerators or plasticizers that might leach into and thereby contaminate the ink within the reservoir 24.

Before the bag 42 is formed by edge-welding the sheets 76, 77, two elements are placed between the sheets. One element, hereinafter referred to as a "release patch" 82, comprises a thin (approximately 25 $\mu$) sheet of material, such as polyester, having a melting point that is substantially higher than the melting point of the polyethylene outer layers of the bag sheets 76, 77. The release patch 82 is generally circular shaped and positioned beneath the opening 80 in the bag 42. Preferably, the release patch 82 includes an adhesive on one side for securing the patch 82 to the second sheet 77 of the bag 42. The release patch 82 provides a mechanism for facilitating attachment of the bag 42 to the fitment 46, as described more fully below.

The second element that is disposed within the bag 42 is a narrow strip, hereinafter referred to as a breather strip 84, of perforated polyethylene material having a maximum thickness of approximately 375 $\mu$, such as that manufactured by Ethyl VisQueen Film Products under the trademark VISPORE. The breather strip 84 provides a mechanism for facilitating movement of air into and out of the bag 42, as described more fully below.

The spring 44 and the bag 42 are attached to the underside of the fitment 46. More particularly, the fitment 46 is formed of polyethylene having a higher melting point than the polyethylene outer layers of the bag sheets 76, 77 and includes a generally flat base plate 86 having an upwardly projecting boss 48. The boss 48 is generally cylindrically shaped and has a chamfered upper end 49. The boss 48 includes an internal duct 50 that extends completely through the boss.

The fitment base plate 86 includes two concentric annular mounting rims 88 that are integrally formed with the base plate 86 to protrude downwardly therefrom through the main aperture 54 in the base 52 of the spring 44. The mounting rims 88, which surround the lower end 90 of the duct 50 are employed for fastening the bag 42 to the fitment 46. To this end, the portion of the first bag sheet 76 that surrounds the bag opening 80 is pressed through the main aperture 54 in the spring 44 to bear upon the mounting rims 88. A heated chuck (not shown) is pressed against the second sheet 77 of the bag 42 immediately beneath the mounting rims 88. Heat from the chuck is transferred from the second sheet 77 via the release patch 82 to the interface of the mounting rims 88 and the first sheet 76. The mounting rims 88, which, as part of the fitment are formed of polyethylene having a higher melting point than the bag, are heated to until the rims 88 and the first sheet 76 flow together to form a weld. Upon cooling, the rims 88 bond with the first layer 76 to form an air-tight seal.

With the bag 42 sealed to the fitment 46 as just described, the only path for air into and out of the bag 42 is through the duct 50 in the fitment boss 48.

It can be appreciated that the release patch 82, in addition to transferring heat from the chuck to the interface of the first sheet 76 and mounting rims 88, separates the first and second sheets 76, 77 in the region where the heated chuck is applied. Accordingly, the release patch 82 prevents the two bag sheets 76, 77 from becoming bonded together at the mounting rims 88.

Preferably, the outermost mounting rim 88 of the fitment 46 is sized to have a diameter that is just slightly less than the diameter of the main aperture 54 in the spring 44. Accordingly, the spring base 52 fits snugly around the outermost rim 88. The effect of this fit is to provide a registration mechanism for centering the spring aperture 54 beneath the duct 50 in the fitment 46. Moreover, the spring base 52 also includes an alignment hole 89 formed therethrough that mates with a downwardly projecting pin (not shown) in the fitment base plate 86. The mating alignment hole 89 and pin provide a supplemental registration mechanism to ensure that the spring 44 is properly positioned relative to the fitment 46.

The bag 42 is fastened to the fitment 46 and spring 44 in a manner that urges the bag into a contracted or minimum volume state. The preferred means for fastening the bag 42 includes heat-welding the bag 42 to the fitment through the access holes 71, 72 at the base 52 of the spring 44, and securing each end 92 of the bag 42 to a corresponding end 68 of a spring leg 62.

More particularly, the underside of the fitment base plate 86 includes four downwardly extending posts 93, each post 93 being shaped and arranged to fit through an aligned access hole 71 in the corner of the spring base 52. The posts 93 pierce the bag sheets 76, 77 as a heated platen (not shown) is pressed against the bag sheets 76, 77. The platen then spreads and flattens the ends of the posts 93 to effectively form a rivet to attach the bag sheets 76, 77 to the fitment base plate 86. This operation is performed while the bag 42 is substantially completely contracted.

Each of two opposing ends of the fitment base plate 86 is formed to have an extension 94 that is attached to the base plate 86 by two spaced apart hinges 95. The hinges 95 are thinner (approximately 250 $\mu$) than the base plate 86 and fold around the associated edges 56, 58 of the spring base 52 so that each extension 94 covers a pair of access holes 72 formed beneath and near each edge 56, 58. Each extension 94 includes on its underside an outwardly projecting pair of posts 96. Each of the posts 96 is sized and arranged to fit through an associated access hole 72. With the posts 96 extending through the access holes 72, both sheets 76, 77 of the bag 42 are pressed against the pairs of posts 96 at each edge 56, 58. The posts 96 are then heat riveted to the contacting bag sheets 76, 77 in a manner as previously described.

Within the space between each pair of hinges 95, a pair of protrusions 98 are formed in the fitment base plate 86 to extend downwardly through the slots 60 in the spring. One protrusion 98 extends through one slot 60. The protrusions 98 help to keep the fitment base plate 86 properly aligned over the base 52 of the spring 44. It is contemplated, however, that the projecting posts 93, 96 will provide adequate alignment of the bag 42 and spring 44 in the absence of protrusions 98.

The breather strip 84 within the bag 42 is aligned between adjacent access holes 72 in the spring and extends completely around each bent edge 56, 58 of the spring 44. Accordingly, the breather strip 84 facilitates air movement through the bag even though the bag is tightly fastened to the edges 56, 58 of the spring base 52 at the access holes 72. Moreover, the breather strip 84 ensures that the bag 42 will expand (i,e., the sheets 76, 77 will move apart) despite condensation within the bag, which condensation would tend to stick the sheets 76, 77 together.

The ends 92 of the bag 42 are wrapped around the ends 68 of the spring legs 62 so that each portion of the bag that is between the edges 56, 58 and the leg ends 68 is pulled firmly against the convex surface 64 of each leg 62 (FIG. 1). The ends 92 of the bag 42 cover the access holes 74 in the leg ends so that when heat is applied to the bag 42 at the access holes 74, the bag 42 will weld to itself within the holes 74 to secure the bag ends 92 to the spring leg ends 68.

The periphery 55 of the fitment boss 48 is sealed to the sleeve 47 in the reservoir cap 40 so that no air can pass between the fitment 46 and the cap 40. The cap 40 is then sealed to the reservoir side walls with the accumulator 20 suspended inside the reservoir 24. The reservoir 24 is then filled with ink, as described earlier.

As noted earlier, the filled pen 22 is provided with a minimum back pressure. Calculated at the print head 36, the minimum back pressure should be, for example, 2.5 cm water column. Accordingly, the minimum back pressure is established by removing some ink from the filled and sealed reservoir. The fluid volume removed to establish the minimum back pressure is referred to as the drawdown volume $V_{dd}$.

It is noteworthy that the bag 42, which is securely held against the spring 44, will not expand appreciably as the drawdown volume $V_{dd}$ is removed. Accordingly, the back pressure attributable to the removal of the drawdown volume will rise rapidly (See line O-A in the graph of FIG. 10) as the drawdown volume $V_{dd}$ is removed because the accumulator bag 42 does not appreciably expand to fill the space (hence, lower the back pressure) corresponding to the drawdown volume $V_{dd}$. It has been found that with an accumulator formed in accordance with the present invention, a very small amount of drawdown volume (for example, less than 5% of the reservoir capacity) is required to bring the back pressure up to the minimum level mentioned above.

Figure 10:
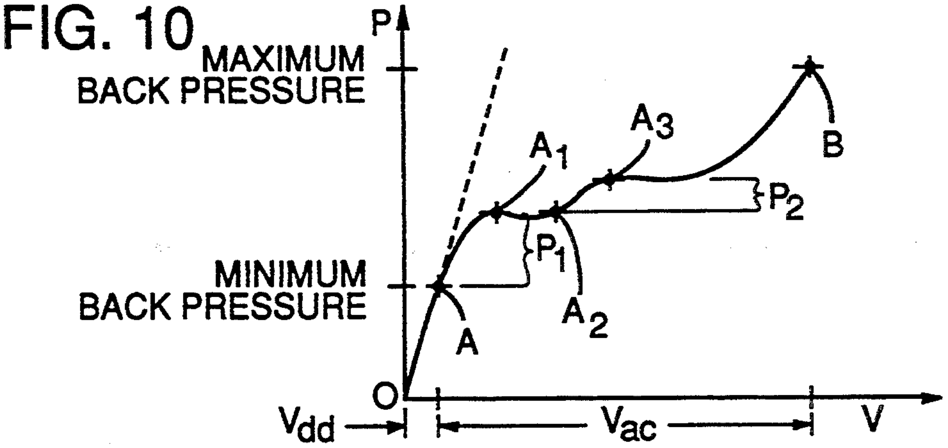
FIG. 10 is a graph showing the relationship between the reservoir back pressure and changes in the ink volume within the reservoir.

The minimum back pressure level establishes the low end of the back pressure operating range referred to above. The maximum back pressure or upper level of the back pressure operating range is that level (for example, 11.5 cm water column) above which the print head 36 would be unable to "pump" against for ejecting ink drops. FIG. 10 illustrates a graph showing the relationship between reservoir back pressure P changes (ordinate) and changes in the fluid volume V (abscissa) of the reservoir. The origin O of the graph of FIG. 10 represents a filled reservoir volume with no back pressure. Also depicted in FIG. 10 is the accumulator working volume $V_{ac}$ that is available for maintaining the back pressure within the reservoir (or, more precisely, at the print head 36) within the operating range between the minimum and maximum back pressure levels shown in the graph.

Figure 2:
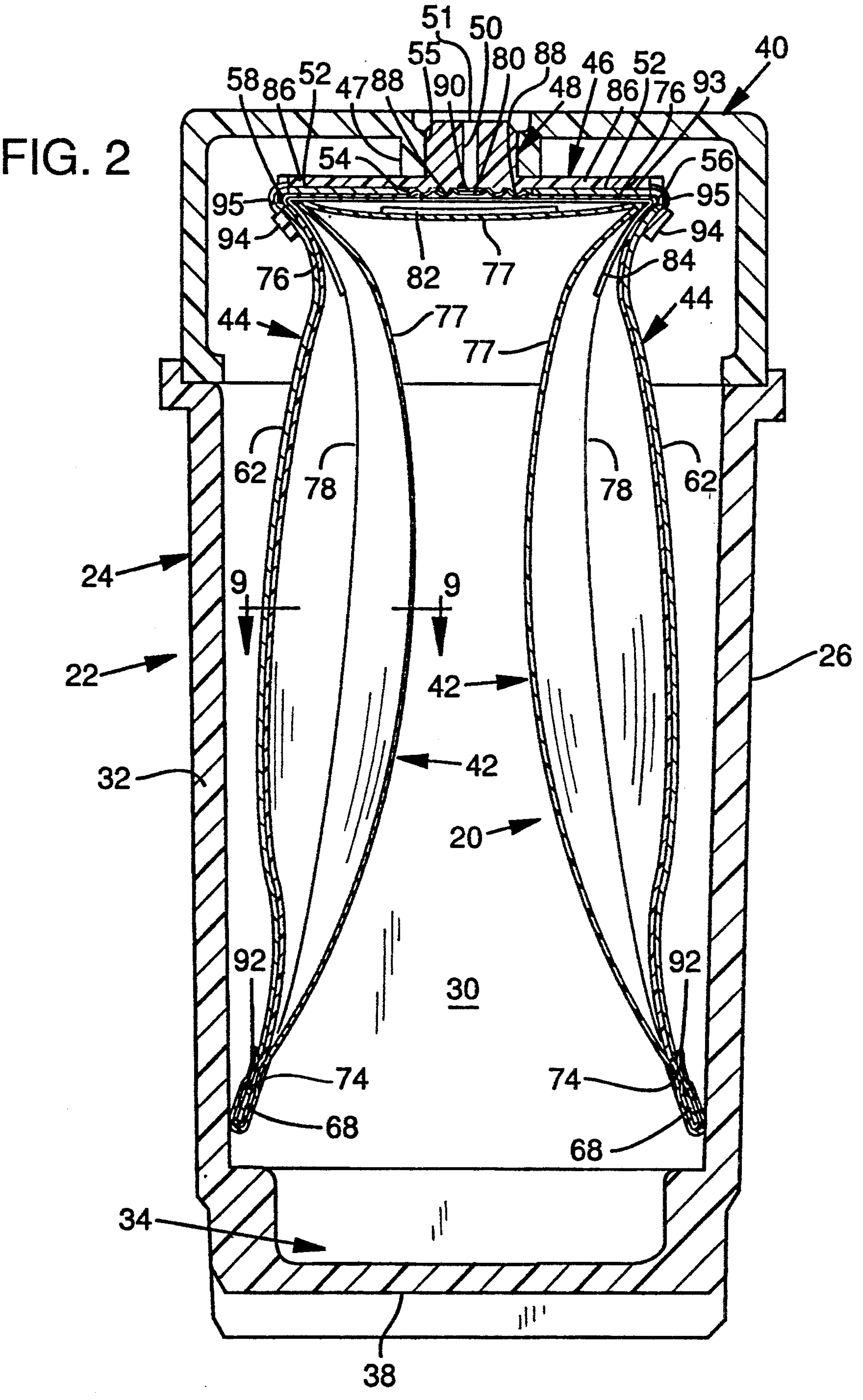
FIG. 2 is a front cross section of an ink-jet pen that includes the accumulator of the present invention shown in the expanded or maximum volume position.
Figure 3:
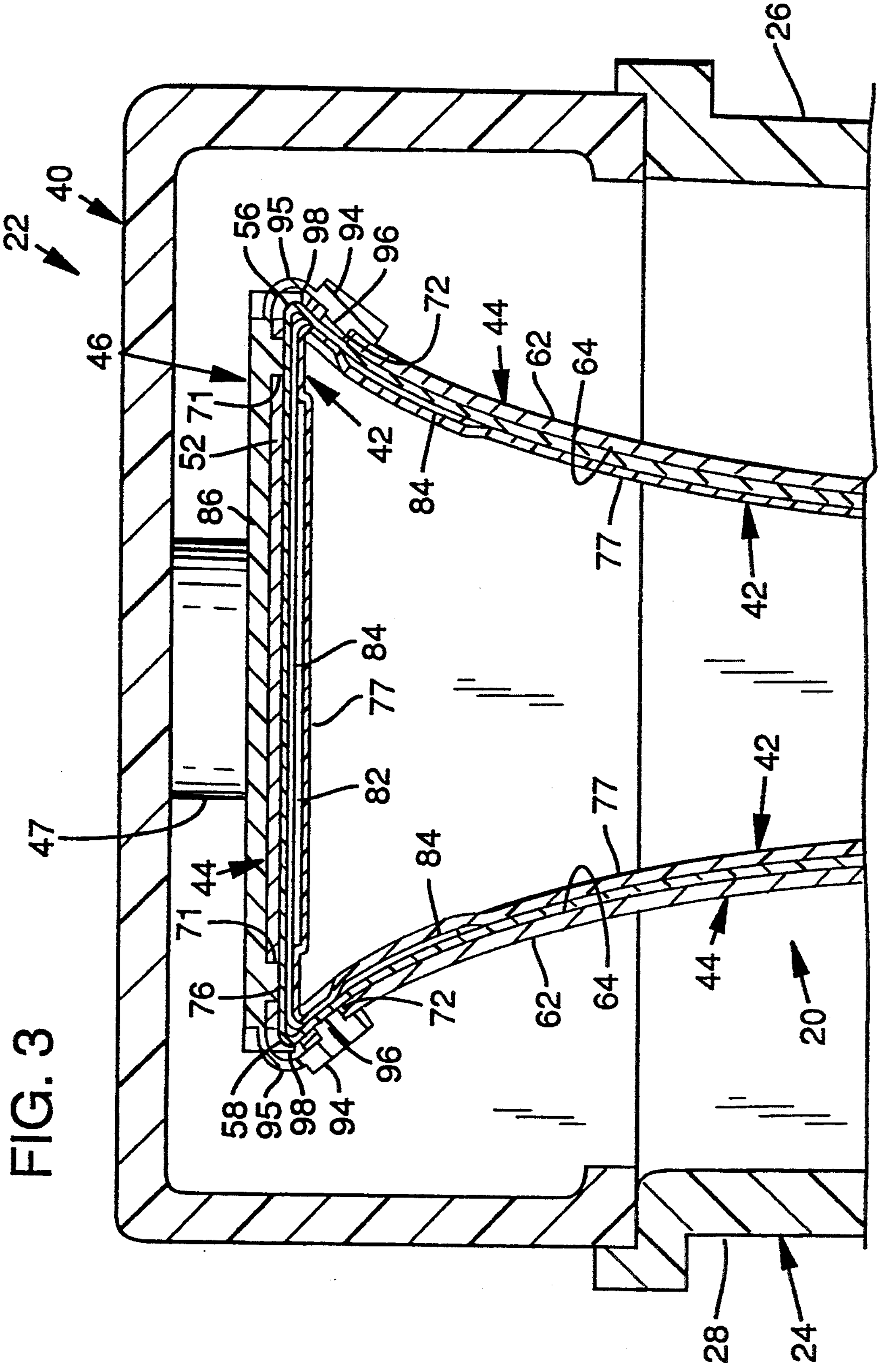
FIG. 3 is an enlarged cross section of the upper portion of the accumulator, showing the accumulator in the minimum volume position.
Figure 4:
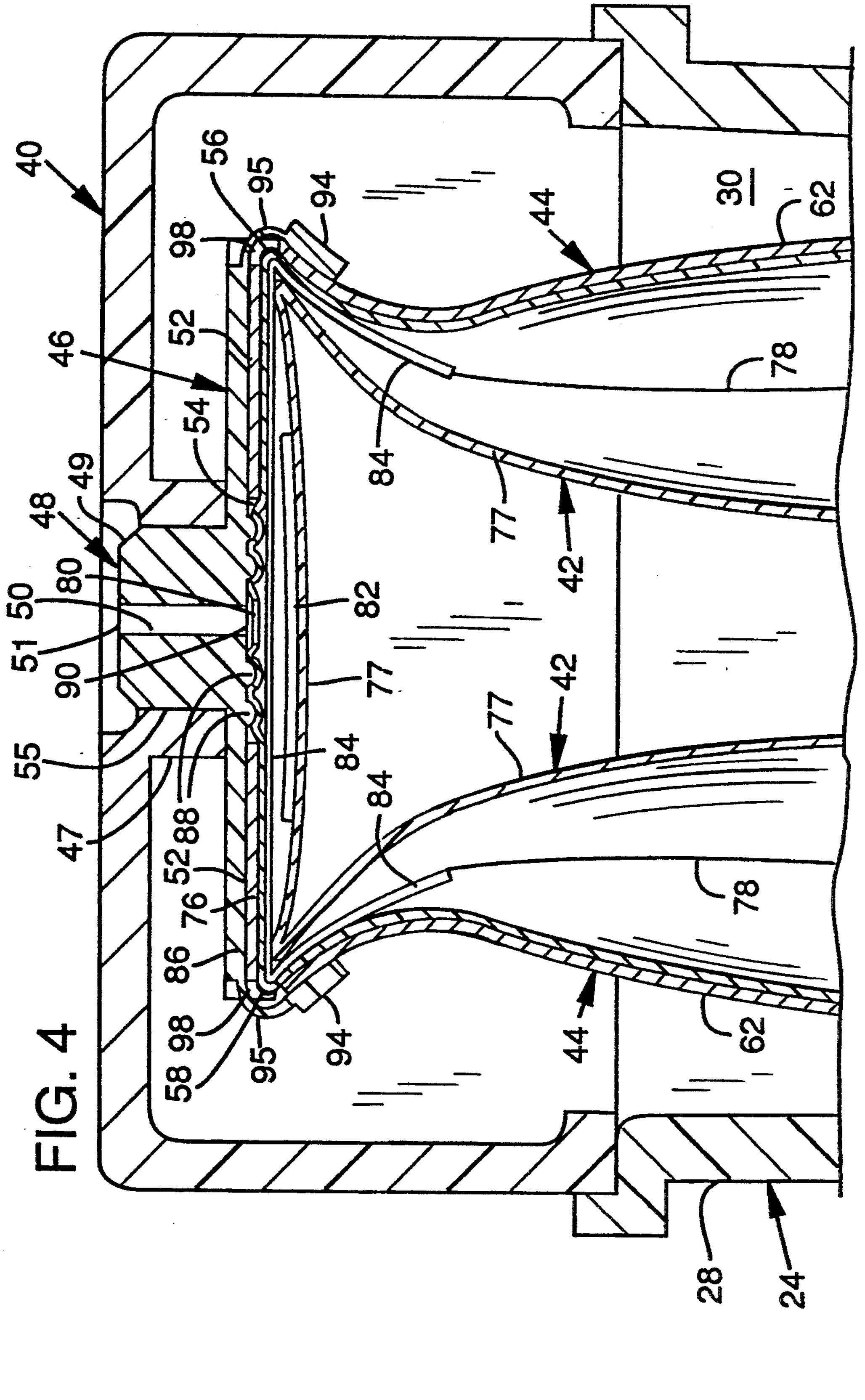
FIG. 4 is an enlarged cross section of the upper portion of the accumulator, showing the accumulator in the maximum volume position.
Figure 5:
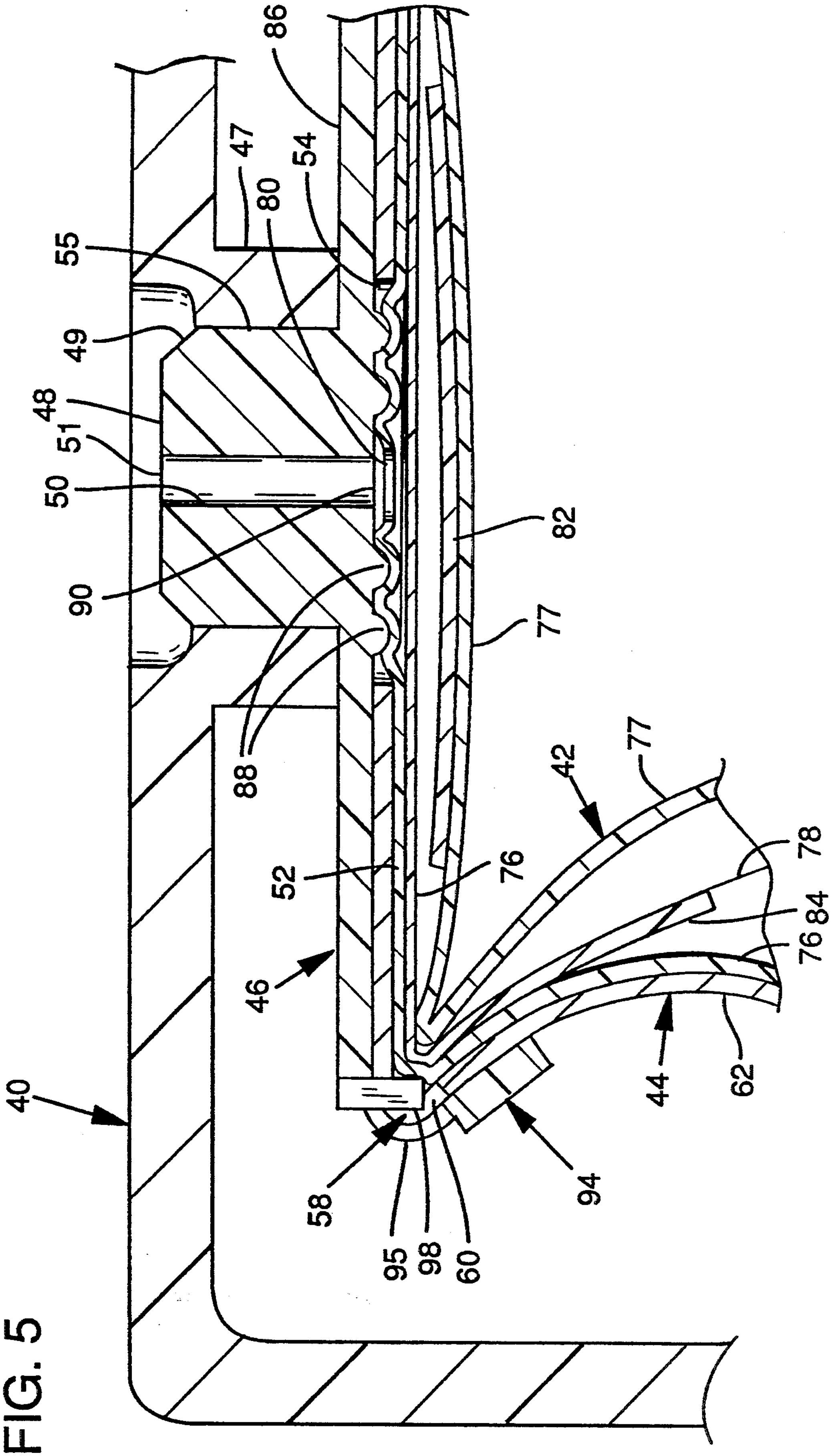
FIG. 5 is an enlarged cross section of a portion of the accumulator showing the assembly of some of the accumulator components.

As the print head 36 operates to eject ink drops from the reservoir 24, the consequent reduction in ink volume in the reservoir increases the back pressure. If this increase were not regulated, the back pressure in the reservoir 24 would rapidly increase (dashed line in FIG. 10), beyond the maximum back pressure, and the print head 36 would become inoperative. With the present accumulator 20, however, the back pressure increase above the minimum level tends to expand the bag 42. More particularly, as the back pressure rises, the relatively higher pressure ambient air is drawn through the duct 50 in the fitment 46 and into the opening 80 in the bag 42. As the bag 42 expands, the first sheet 76 of the bag presses against the spring legs 62 so that those legs 62 are deflected out of the relaxed, curved configuration (FIG. 1) into a reverse bowed configuration (FIG. 2).

The elasticity of the spring legs 62, which tends to contract the bag 42 against the convex surfaces 64, is substantially overcome by the expansion of the bag 42 that is caused by the increase (over minimum) of the back pressure within the reservoir 24. The volume decrease in the reservoir 24 that is attributable to the expansion of the bag 42 maintains the back pressure beneath the maximum back pressure discussed above.

In a preferred embodiment, the bag 42 expands to its maximum volume condition as ink is printed out of the pen. During this expansion the bag 42 maintains the back pressure beneath the maximum back pressure level. At the point when the bag 42 of the preferred embodiment has expanded to its maximum volume condition, about 30% of the pen's ink has been printed out. Any further printing will cause a further increase in back pressure, which may be relieved by the introduction of ambient air into the reservoir 24. To this end, the pen 22 includes a bubble generator 102 formed in the bottom wall 38 of the reservoir 24. The bubble generator 102 may comprise a small orifice 104 extending from a recess 106 in the reservoir bottom wall 38.

The orifice 104 of the bubble generator 102 is sized, for example, about 200 $\mu$ in diameter, so that any air bubbles will move through the air/ink interface at the orifice 104 and into the reservoir air space only in instances where the back pressure begins to rise above the maximum back pressure level (FIG. 10). As air bubbles from the bubble generator 102 enter the reservoir 24, the back pressure will drop to a level just below the maximum level so that the print head 36 is able to continue ejecting ink drops.

As noted earlier, the greatest change in the reservoir back pressure will occur as a nearly empty pen is subjected to a significant ambient air pressure increase, such as would occur during air shipment of the pen. In such an instance, as the ambient air pressure begins to drop, the pressure in the bag 42 also drops. As the pressure drops, the bag 42, which just prior to the ambient air pressure drop is expanded to its maximum volume (See FIG. 2 and point B in FIG. 10), collapses to increase the reservoir volume and thereby keep the back pressure from dropping to a level so low that ink may leak from the print head 36. Moreover, the elastic recovery of the spring legs 62 in returning toward the undeflected state as the bag 42 collapses ensures that the bag will be contracted to its minimum volume configuration (FIG. 1) so that the entire amount of the accumulator working volume $V_{ac}$ is employed for increasing the reservoir volume.

In the preferred embodiment, it has been found that an accumulator 20 formed as described above will provide a working volume large enough to compensate (for example, by contracting from its maximum to minimum volume level as just described) for ambient air pressure changes of up to approximately 30%. As noted earlier, the most severe ambient air pressure change experienced by a pen would likely be in the range of approximately 26%. Accordingly, for ambient air pressure decreases of 30% or lower, the accumulator 20 of the present invention provides sufficient working volume to keep the back pressure above the minimum back pressure level. It can be appreciated, therefore, that unlike accumulators of the past, the present accumulator 20 need not be supplemented with any overflow mechanisms, such as the overflow orifice and attached catch basin mentioned above. Moreover, the pen volume that would otherwise be necessary for a catch basin may instead be used to increase the ink capacity of the pen.

In the event that a pen 22 may be subjected to an ambient air pressure decrease of greater than about 26%, it is contemplated that the bag 42 of the accumulator 20 may be configured for providing a greater working volume than described above. For example, an alternative embodiment of the accumulator bag 142 may be pleated as shown in the cross-sectional view of FIG. 11. The pleated bag 142 will provide a significant amount of accumulator working volume because it will expand to a maximum volume that is substantially larger than the unpleated bag 42, and still be contractible against the convex surfaces 64 of the spring legs 62 to a minimum volume that is substantially equal to that of an unpleated bag 42.

With respect to the use of the pleated bag 142, it is preferred to attach thin webs 108 of film material between the inner folded edges 110 of the bag pleats. The webs 108 are placed at closely placed intervals along the length of the bag 142 and serve to keep the pleats from inverting under the influence of the back pressure within the reservoir. Consequently, the webs 108 ensure that the pleated bag will return to the flat minimum volume position as the back pressure in the reservoir decreases.

Another technique for increasing the accumulator working volume may include the use of a bag that is relatively longer than the earlier described bag 42 and which, after being attached to the spring leg ends 68 as described earlier is folded back over the portion of the bag overlying the convex surfaces 64 of the spring legs 62. The outermost end of the longer bag is then heat-welded to the posts 96 in the fitment extensions 94. With this embodiment, additional breather strips 84 would be included within the bag to be wrapped around the spring ends 68 between the access holes 74 in those ends 68 so that air may flow through the entire length of the bag.

Typically, slight variations in the materials and construction of the present accumulator will result in the near complete inflation of one portion of the bag 42 that is adjacent one spring leg 62 before inflation of the portion of the bag that is adjacent to the other spring leg 62. Referring to FIG. 10, the vertical component of the curve portion from point A to $A_1$ generally represents the back pressure increase that occurs as the print head begins to eject ink drops from a full reservoir. The back pressure increase $P_1$ between points A and $A_1$ causes the partial expansion of one bag portion (for convenience, referred to as the "first" bag portion 63, FIG. 12) that is adjacent to one spring leg 62. Put another way, the back pressure increase $P_1$ expands the first bag portion 63 to bend the spring leg 62 out of the relaxed state (FIG. 1) and into an intermediate position wherein the spring leg 62 has moved to a generally straight configuration as shown in FIG. 12.

Figure 12:
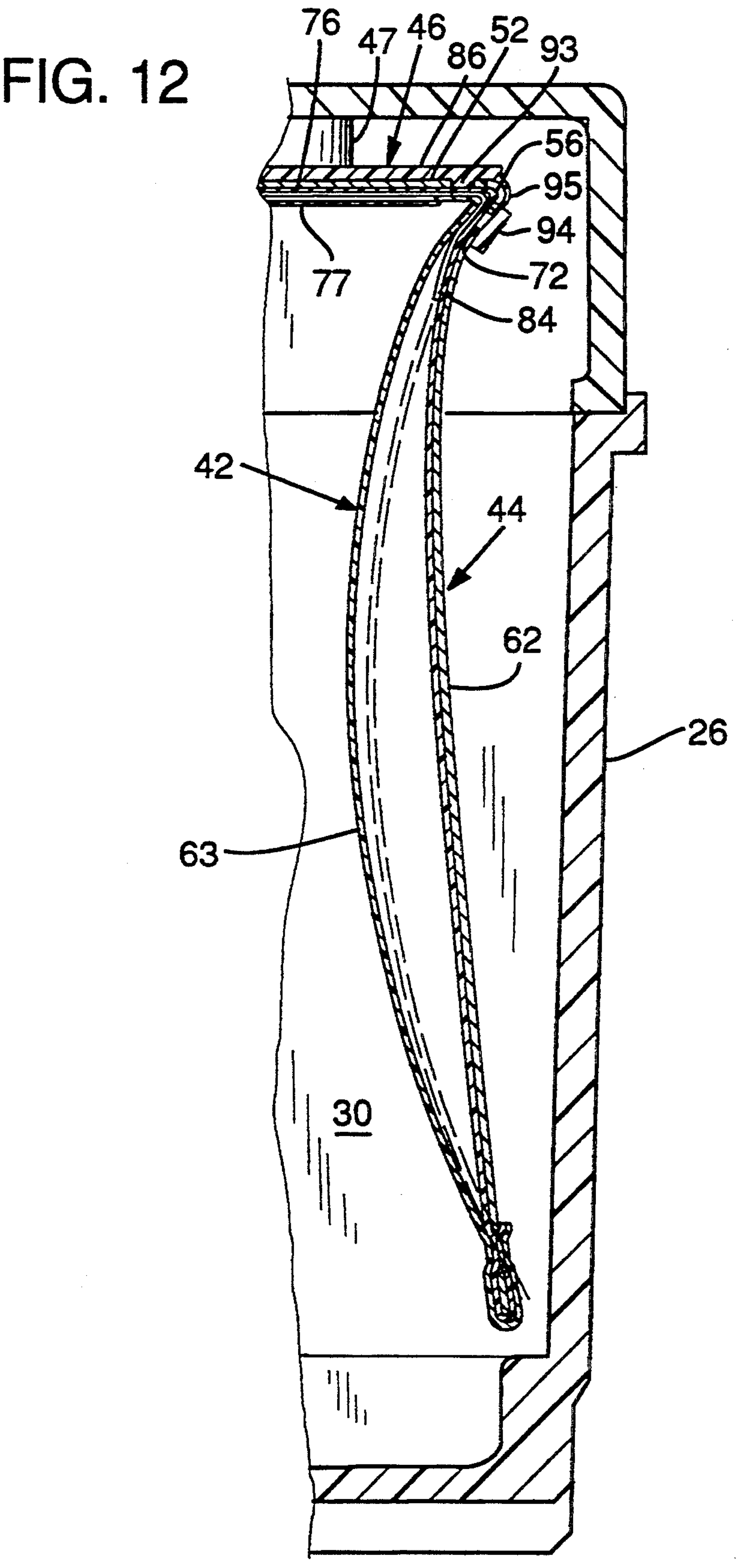
FIG. 12 is a partial front cross section of an ink-jet pen that includes the accumulator of the present invention, a portion of the accumulator being shown in a position intermediate the fully contracted or minimal volume position of FIG. 1 and the expanded or maximum volume position of FIG. 2.

After the spring leg 62 is bent into the generally straight configuration of FIG. 12, the spring offers only slight resistance to further deflection from the straight and into the reverse-bowed configuration (FIG. 2). Accordingly, the first bag portion 63 readily inflates to its fully expanded position as more ink is ejected from the pen as represented by curve section $A_1$–$A_2$, FIG. 10.

The inflation of the first bag portion 63 associated with the reservoir ink depletion represented by curve segment $A_1$–$A_2$ effectively regulates the reservoir back pressure so that substantially no incremental back pressure increase occurs during that period. Instead, there is usually a slight decrease in back pressure because the spring leg 62, in moving out of the generally straight configuration (FIG. 12) and into the reverse-bowed configuration, acts as a toggle mechanism having a slight snap-action that results in a rapid incremental expansion of the first bag portion 63 and consequent dip in the reservoir back pressure level.

The vertical component of the curve portion from point $A_2$ to $A_3$ generally represents the back pressure increase $P_2$ that occurs as the print head continues to eject ink from the reservoir after the first bag portion is fully inflated. The back pressure increase $P_2$ expands the bag portion that is mounted to the spring leg that is opposite the leg 62 to which the first bag portion 63 is mounted. Accordingly, the back pressure increase $P_2$ expands the other bag portion to bend the associated spring leg 62 out of the relaxed state (FIG. 2) into an intermediate position wherein a spring leg assumes a generally straight configuration. Thereafter, the bag portion is fully inflated, as described with respect to the first bag portion 63, and the leg 62 moves into the reverse-bowed configuration.

The above-described preferred embodiment of the present accumulator is designed to ensure that the incremental increases in back pressure $P_1$ and $P_2$ (FIG. 10), which cause straightening of the spring legs 62 as described above, are predictably small enough to avoid approaching the maximum back pressure allowable for a given pen. In other words, the spring 44 and bag 42 are configured and arranged to minimize these incremental back pressure increases $P_1$, $P_2$ so that once the reservoir back pressure is established above the required minimum back pressure, the pressure-volume curve (FIG. 10) will approach, as closely as practical, an ideal pressure-volume curve, which ideal curve is substantially parallel to the absisca of FIG. 10 and between the minimum and maximum back pressures.

The next-described preferred embodiment of the accumulator spring permits effective minimization of the incremental pressures $P_1$ and $P_2$ so that the corresponding actual pressure-volume curve can more closely approximate the ideal pressure-volume curve. Moreover, the alternative configuration of the spring provides relatively greater flexibility in the ends of the spring legs so that the spring legs can bend to better conform to the fully-inflated shape of the bag, thereby facilitating greater expansion of the bag and a corresponding increase in the overall working volume $V_{ac}$ of the accumulator.

Figure 13:
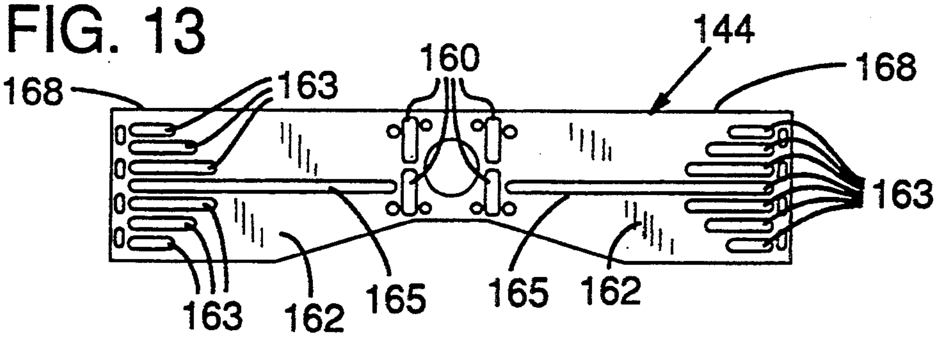
FIG. 13 is a plan view of an alternative spring component of the accumulator, depicting the spring as it appears before it is shaped into the undeflected position.

FIG. 13 shows the alternative embodiment of the spring 144 in plan, before it is shaped into the relaxed position (see FIG. 1) for use with the bag 42. The spring 144 is shaped so that each end 168 of a leg 162 is made to be slightly more flexible than the remaining portion of the spring. The relatively greater flexibility of the spring ends 168 is accomplished by forming an array of apertures 163 near each end 168, thereby reducing the mass of that portion of the spring 144. Preferably, the apertures 163 are generally elongated in the direction parallel to the long axis of the spring member 144. It is also preferred that near the center of the spring member 144, the apertures 163 are slightly longer, the length of the apertures generally decreasing in the direction away from the longitudinal center of the spring member 144.

Figure 14:
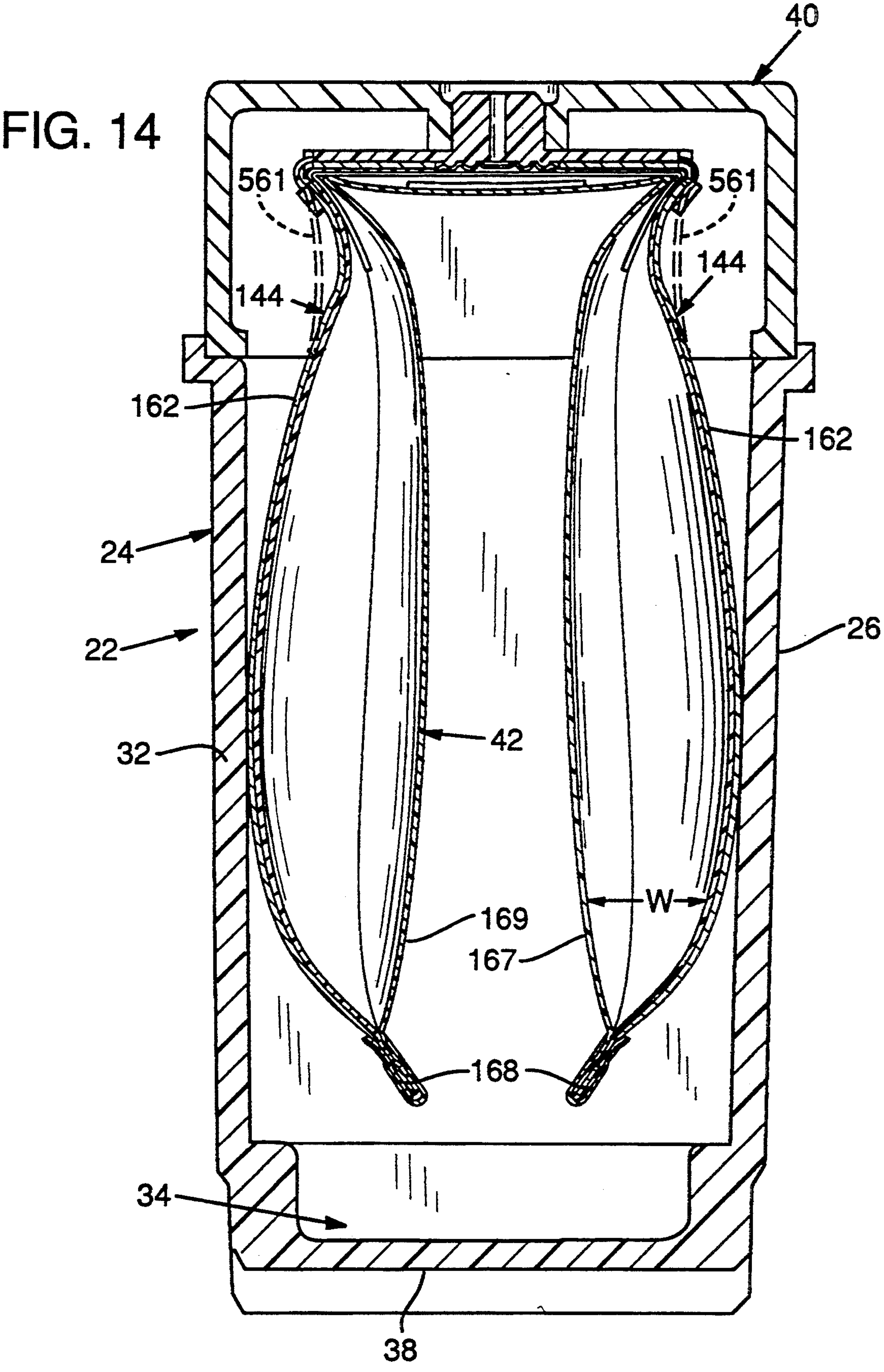
FIG. 14 is a front cross section of an ink-jet pen that includes the accumulator of the present invention utilizing the alternative spring component of FIG. 13 and showing the accumulator in the expanded or maximum volume position.

FIG. 14 depicts a front cross-section of an ink jet pen that includes an accumulator utilizing the alternative spring member 144, showing the accumulator in the expanded or maximum volume position. It is noteworthy that as a consequence of the increased flexibility (that is, reduced resistance to deflection) of the spring ends 168, the bag portions 167, 169 mounted to the spring legs 162 are able near spring ends 168 to expand to a width "W" that is greater than would be possible were the ends of spring legs 162 not so flexible. This increased bag width W near the spring ends 168 provides a corresponding increase in the overall working volume $V_{ac}$ of the accumulator. This working volume $V_{ac}$ increase expands the environmental operating range of the pen without a corresponding reduction in the amount of deliverable ink within the reservoir because the alternative spring and attached bag resile to the substantially flat, relaxed configuration, thereby not displacing any more ink volume than displaced by the earlier described embodiment.

Also formed in the alternative embodiment of the spring member 144 is an elongated slit 165 that is formed generally along the longitudinal center line of the spring member to extend from the end 168 of each spring leg 162 to a location near the slots 160 in the spring member, through which slots 160 the spring member 144 is bent for attachment to the fitment as described above. Such a slit 165 reduces the spring mass along substantially the entire length of the spring leg 162. The spring mass reduction associated with the longitudinal slit 165 increases the overall flexibility of the spring, thereby substantially eliminating the snap-action or toggle-like effect of the spring legs as mentioned above. As a result of the increased flexibility, the incremental back pressure increases $P_1$ and $P_2$ are substantially minimized. Put another way, the overall configuration of the spring 144 is more uniformly responsive to the forces applied to it by the expanding bag 42. As was the case with the earlier-described embodiment, contraction of the bag permits the spring 144 to resile toward the relaxed configuration where the bag is flattened.

Figure 15:
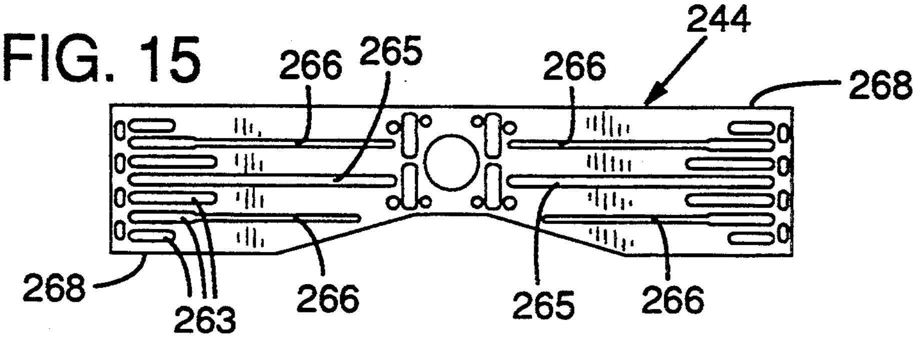
FIGS. 15–18 depict in plan view alternative embodiments of the spring component showing the spring components depicting the springs as they appear before they are shaped into the undeflected position.

It will be appreciated by one of ordinary skill in the art that numerous alternative embodiments for a spring member may be used. For example, FIG. 15 depicts another alternative embodiment of the spring member 244 wherein a pair of additional longitudinal slits 266 extend generally along the length of the legs 262 from each end 268, with a central longitudinal slit 265 between each pair of slits 266.

Figure 16:
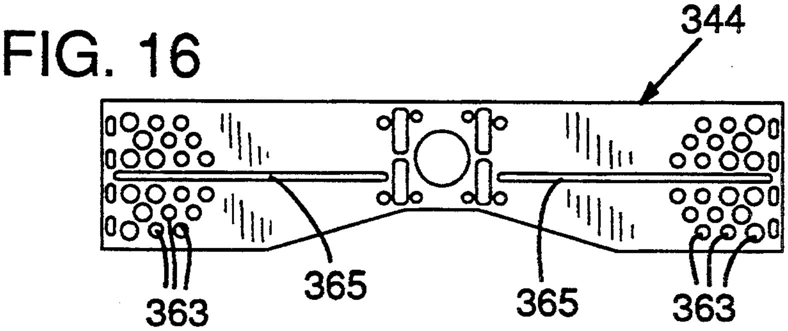

FIG. 16 depicts another alternative embodiment of a spring member 144 where, in addition to a central longitudinal slit 365, end apertures 363 are formed as generally circular in shape.

Figure 17:
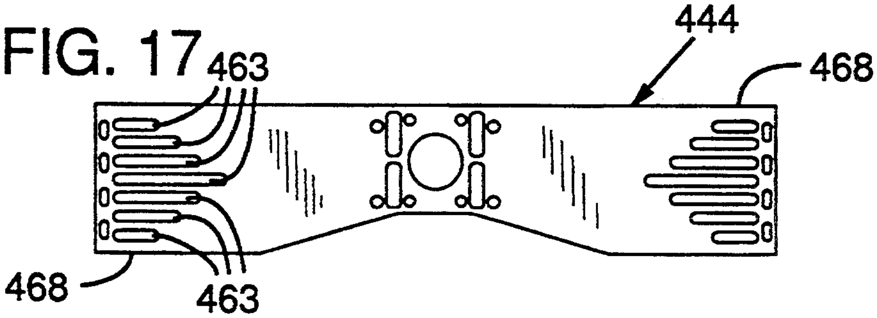

FIG. 17 depicts another alternative embodiment of a spring member 444 having no central longitudinal slit. A plurality of apertures 463, configured and arranged substantially the same as apertures 163 in the embodiment depicted in FIG. 13, are formed near the ends 468 of the spring member 444 for the same flexibility enhancement as mentioned above.

Figure 18:
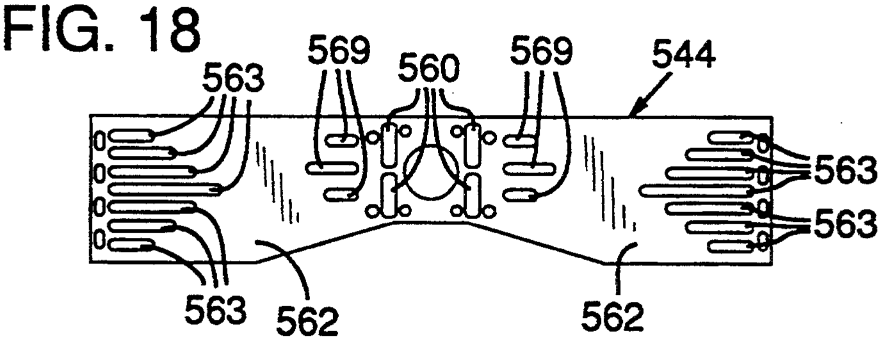

FIG. 18 depicts another alternative embodiment of a spring member 544 where, in addition to end apertures 563, such as those shown as 463 in FIG. 17, there is also included a few more apertures 569 formed in the spring legs 562 near the slots 560 through which the member 544 is bent for attachment to a fitment. These additional slots 569 make more flexible the portion of the spring legs 562 near those slots 560. Accordingly, as shown in dashed lines 561 in FIG. 14, the upper parts of bag portions 167, 169 are able to expand to a slightly greater width than would otherwise be possible with a spring member not having the upper apertures 569. As a result, the slightly increased volume depicted by dashed lines 561 increases the working volume $V_{ac}$ of the accumulator.

Having described and illustrated the principles of the invention with reference to preferred embodiments and alternatives, it should be apparent that the invention can be further modified in arrangement and detail without departing from such principles. For example, a spring having only a single leg carrying a bag on its convex surface may provide a sufficient accumulator working volume. Moreover, an effective accumulator may include a spring that is curved about its longitudinal axis instead of about a lateral axis as described above. Furthermore, the spring may be configured with other arrangements of holes or slots, or thickness variations that will affect its elasticity and in turn will modify the back pressure as the bag expands and forces the spring to uncurl. It is also contemplated that the function of the spring in contracting the bag and in minimizing draw-down volume may be accomplished by a spring configuration having two layers with the bag contracted between those layers when the spring is in its undeflected configuration. It is also possible that the bag may be formed so that one of the two bag layers has the elastic characteristics of the spring, thereby eliminating the need for a discrete spring component.

In view of the above, it is to be understood that the present invention includes all such modifications as may come within the scope and spirit of the following claims and equivalents thereof.

We claim:

1. An accumulator apparatus comprising:

an expandable and contractible bag;

mounting means for mounting the bag within a fluid volume of a particular size so that expansion of the bag decreases the size of the fluid volume, the bag including an opening arranged so that an interior of the bag is in communication with ambient air outside the fluid volume; and a spring disposed within the fluid volume and having a first portion that assumes a curved relaxed state, part of the bag being adjacent to one side of the curved first portion, the bag part being urged by the spring to be substantially fully contracted when the spring first portion is in the relaxed state.

2. The apparatus of claim I wherein the first portion of the spring has a convex surface whenever the first portion is in a relaxed state, the bag part being adjacent to the convex surface.

3. The apparatus of claim 1 wherein the spring has a flat base connected to the first portion of the spring.

4. The apparatus of claim 3 wherein the spring includes a second portion connected to the base, the second portion assuming a curved relaxed state, another part of the bag being disposed adjacent to one side of the second portion and to one side of the base of the spring.

5. The apparatus of claim 1 wherein the spring includes a second portion that assumes a curved relaxed state, another part of the bag being disposed adjacent to one side of the curved second portion.

6. The apparatus of claim 1 wherein the spring is stainless steel.

7. The apparatus of claim 1 wherein the spring has a thickness of about 75 microns and a yield strength greater than about 5,600 Kg/cm$^2$.

8. An accumulator apparatus comprising:

an expandable and contractible bag;

mounting means for mounting the bag within a fluid volume of a particular size so that expansion of the bag decreases the size of the fluid volume, the bag including an opening mounted so that an interior of the bag is in continuous communication with ambient air outside the fluid volume, wherein the bag is formed of flexible material and is contractible into a generally flat configuration and wherein the fluid volume is defined by a reservoir, the reservoir being sealed and containing ink therein under a back pressure, the back pressure being present irrespective of whether the bag is expanded or contracted.

9. The accumulator apparatus of claim 8 further comprising a print head connected to the reservoir for ejecting drops of ink from the reservoir.

10. The apparatus of claim 8 wherein the bag comprises sheets formed of heat-weldable material.

11. The apparatus of claim 9 wherein the bag sheets include a film of air-impermeable material attached thereto for rendering the bag substantially impermeable to air.

12. An accumulator for an ink-jet pen that has a substantially sealed reservoir volume, comprising:

a spring; and an expandable and contractible bag attached to one side of the spring, the spring and bag being positionable within the reservoir volume, the bag including an opening arranged so that an interior of the bag is in communication with ambient air outside of the reservoir volume, the bag and spring being attached adjacent one another so that the bag expands to deflect the spring as fluid pressure inside the reservoir volume decreases relative to pressure of the ambient air outside of the reservoir volume.

13. The accumulator of claim 12 further comprising print head means for ejecting ink drops from the reservoir volume.

14. The accumulator of claim 12 wherein the spring contracts the bag as fluid pressure outside the reservoir volume decreases relative to fluid pressure inside the reservoir.

15. The apparatus of claim 12 wherein the spring includes a first portion that assumes a curved relaxed state, the bag being attached to one side of the curved first portion.

16. The apparatus of claim 15 wherein the first portion of the spring has a convex surface whenever the first portion is in a relaxed state, the bag being attached to the convex surface.

17. The apparatus of claim 12 wherein the spring is metal and the bag is formed of flexible material having a plastic outer surface.

18. An accumulator apparatus comprising:

a sealed reservoir for containing ink and having a back pressure established therein;

an expandable and contractible bag mounted within the reservoir, the bag having an opening therein arranged so that an interior of the bag is in communication with ambient air outside of the reservoir, the bag being arranged so that contraction of the bag increases back pressure in the reservoir; and a print head mounted to the reservoir and adapted for ejecting ink drops from the reservoir.

19. The apparatus of claim 18, further comprising a spring disposed adjacent to the bag and arranged to urge contraction of the bag for increasing the reservoir back pressure.

20. The apparatus of claim 19 wherein the spring and bag are configured and arranged so that the bag is substantially fully contracted when the spring is in a relaxed state.

21. The apparatus of claim 19 wherein the bag is attached to the spring by a fitment, and the spring includes a plurality of access holes formed therein, the bag being attached to the fitment through the access holes.

22. The apparatus of claim 21 wherein the fitment includes other access holes for attaching the bag to said bag through the other access holes.

23. A method for making an accumulator apparatus, comprising the steps of:

attaching an expandable and contractible bag to a spring so that when the spring is in a relaxed state the bag will be substantially contracted;

configuring the bag and spring so that the bag will expand and deflect the spring whenever a pressure difference between the fluid inside and outside of the bag exceeds a predetermined minimum level; and supporting the bag and spring to maintain the interior of the bag in fluid communication with fluid outside of the bag thereby to define an unobstructed path for fluid movement into and out of the bag.

24. The method of claim 23 wherein the configuring step includes the substep of shaping the spring to have a curved portion when in a relaxed state.

25. The method of claim 24 wherein the attaching step includes the substep of fastening the bag to the curved portion of the spring.

26. The method of claim 23 wherein the spring is metal and wherein the bag has a plastic outer surface, the attaching step including the substep of forming access holes in the spring for providing locations for attaching the bag to the spring.

27. The method of claim 23 wherein the accumulator is to be disposed within a fluid volume that may be subjected to a decrease in pressure, the configuring step including the step of sizing the bag to define a working volume that is equal to or greater than a change in the fluid volume attributable to the decrease in pressure.

28. An accumulator apparatus for an ink reservoir of a pen comprising:

an elongated spring member mounted inside the reservoir and shaped to resile to a relaxed state and to resist deflection out of the relaxed state;

an expandable and contractable bag mounted along the length of the spring member so that expansion of the bag deflects the spring member and so that contraction of the bag permits the spring member to resile toward the relaxed state; and shaping means for reducing along only a portion of the length of the spring member the resistance of the spring member to deflection caused by bag expansion.

29. The apparatus of claim 28 wherein the elongated spring member has a longitudinal centerline and an end and a middle portion away from the end, and wherein the first portion of the spring member is located away from the middle portion of the spring member.

30. The apparatus of claim 29 wherein the first portion of the spring member has an array of apertures formed therein for reducing the resistance of the spring member to deflection.

31. The apparatus of claim 30 wherein the first portion of the spring member is located adjacent to the end of the spring member.

32. The apparatus of claim 30 wherein the first portion is located on opposite sides of the middle portion of the spring member.

33. The apparatus of claim 30 wherein the spring member is constructed with the array of apertures shaped to reduce the mass of the spring member near the longitudinal centerline by an amount greater than the amount of mass reduced by the apertures away from the longitudinal centerline of the spring member.

34. The apparatus of claim 33 wherein the first portion of the spring member is located adjacent to the end of the spring member.

35. The apparatus of claim 33 wherein the first portion is located on opposite sides of the middle portion of the spring member.

36. The apparatus of claim 30 wherein the spring member is constructed with the array of apertures shaped to reduce the mass of the spring member near the end of the spring member by an amount greater than the amount of mass reduced by the apertures away from the end of the spring member.

37. The apparatus of claim 36 wherein the first portion of the spring member is located adjacent to the end of the spring member.

38. The apparatus of claim 30 wherein the spring member is configured to include a slit formed along the longitudinal centerline of the spring member to extend substantially continuously from the end of the spring member through the middle portion of the spring member.

39. The apparatus of claim 30 wherein the spring member is configured to include a plurality of spaced apart slits extending along the length of the spring member.

40. The apparatus of claim 28 wherein the first portion of the spring member is thinner than the remaining portion of the spring member.

* * * * *